United States Patent

[11] 3,610,360

[72] Inventor Conrad O. Gardner
     99 Woodhaven, Edmonds, Wash. 98020
[21] Appl. No. 14,300
[22] Filed Feb. 26, 1970
[45] Patented Oct. 5, 1971
     Continuation-in-part of application Ser. No.
     545,117, Apr. 25, 1966, now Patent No.
     3,503,188.

[54] MOTOR VEHICLE EXHAUST OUTLET ARRANGEMENTS AND SYSTEMS FOR COUPLING TO MOTOR VEHICLE EXHAUST OUTLETS
5 Claims, 4 Drawing Figs.

[52] U.S. Cl. ............................................. 180/64 A
[51] Int. Cl. ............................................. B60k 13/04
[50] Field of Search .................................. 180/64 A,
                                                     54 A, 1

[56] References Cited
UNITED STATES PATENTS
2,695,630  11/1954  Klein et al. .................. 180/64 A UX
2,558,023  6/1951   Walsh ............................ 180/1 UX FOREIGN PATENTS
1,468,222  12/1966  France .......................... 180/64 A Primary Examiner—Leo Friaglia
Assistant Examiner—Milton L. Smith
Attorney—Theron H. Nichols ABSTRACT: Motor vehicle exhaust outlet arrangements and systems for receiving the noise and/or exhaust emissions transmitted from motor vehicle exhaust outlet arrangements. The motor vehicle transmitter of noise and/or exhaust emissions have a modified tailpipe arranged for close coupling and transmission of the noise and/or exhaust emissions to receiving means for collecting and processing the noise and/or exhaust emissions. The receiving means extends along the length of the highway and attenuates the received noise and/or collecting and passing the received exhaust emissions to processing means for recovering or purifying the exhaust emissions.

PATENTED OCT 15 1971 3,610,360
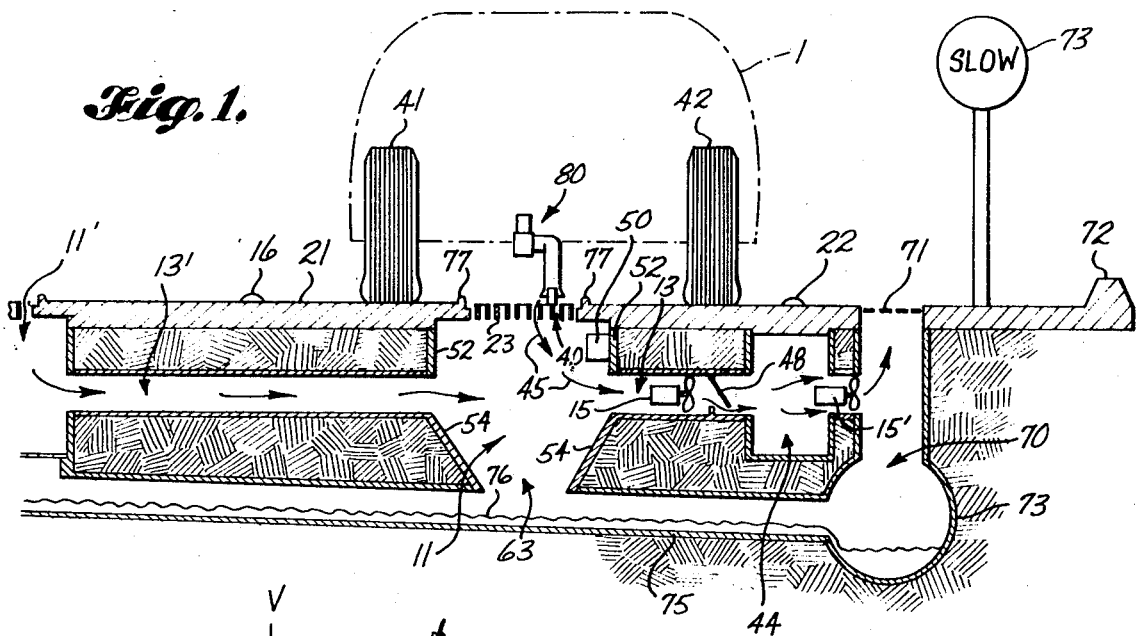
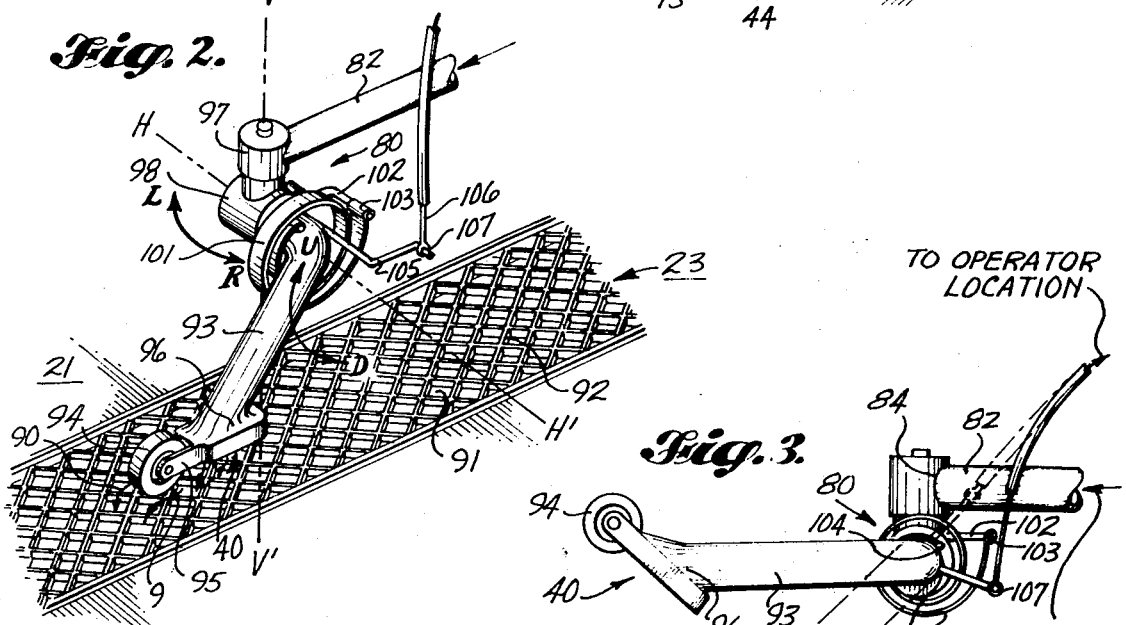
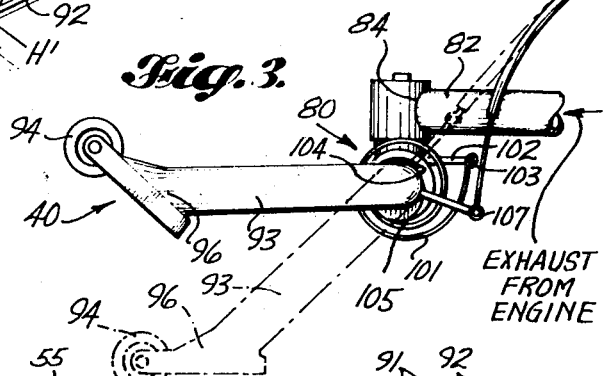
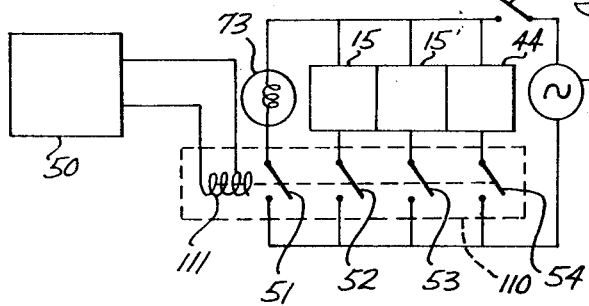
INVENTOR.
CONRAD O. GARDNER
BY
Theron H. Nichols
AGENT

MOTOR VEHICLE EXHAUST OUTLET ARRANGEMENTS AND SYSTEMS FOR COUPLING TO MOTOR VEHICLE EXHAUST OUTLETS

This application for Letters Patent is a continuation-in-part of my application Ser. No. 545,117 filed Apr. 25, 1966, Now U.S. Pat. No. 3,503,188.

The present invention relates to motor vehicle exhaust outlet arrangements particularly useful and efficient in systems of the type disclosed in the aforementioned copending application and in systems of the type herein disclosed.

While modifications of the internal combustion engine and proposed use of afterburners for conversion of carbon monoxide to carbon dioxide and improvements in fuels by reduction of their lead content or reducing the amount of butane contained therein and other advances will continue to improve the quality of the exhaust emissions (reduce the amounts of known harmful pollutants contained therein), such improvements amount to increased costs which must be absorbed in increased motor vehicle cost by the purchasers. Other basic propulsion systems such as electric for example, while providing a great improvement from the air pollution standpoint suffer in all other categories such as efficiency, power output capabilities, etc. The present state of the art includes proposals such as the hybrid electric-internal combustion motor vehicle which would switch over to electric power in high-pollution danger areas and utilize the internal combustion engine in suburban and rural areas where there is no danger of a large number of vehicles causing high concentrations of carbon monoxide and hydrocarbons above levels which can be tolerated.

Exhaust noise transmitted via the outlets of current exhaust pipes have been attenuated to some extent upstream by the muffler designers but where a great concentration of vehicles are found a noise level measured in decibels exists which although tolerable for short periods by persons in the region of these vehicles, becomes intolerable over long periods of time and can effect thought processes and work performance in many persons.

It is accordingly an object of the present invention to provide a system which may be coupled to motor vehicle exhaust outlets to attenuate exhaust noise and/or purify exhaust emissions transmitted therefrom.

A further object of this invention is to provide a system for attenuating exhaust noise and/or purifying exhaust emissions which may be deployed in those particular areas or regions or traffic routes where exhaust noise and/or exhaust emissions can reach undesirable levels due to heavy traffic concentration and/or peculiar terrain and atmospheric conditions prevalent in some low-lying regions for example.

It is yet another important object of the present invention to provide a motor vehicle exhaust outlet arrangement which can provide different degrees of coupling of transmitted exhaust to highway surface receiving means at the command of the motor vehicle driver and depending upon the presence or absence of the receiving means beneath the vehicle.

Still another significant feature of the present invention is to provide a receiving system for purifying or recovering exhaust emissions in the atmosphere above a highway surface which is operated automatically when the carbon monoxide level adjacent the highway surface exceeds a predetermined level.

An addition to the previously set forth objects, the present invention is arranged in such a manner that installation costs are minimal to both the motor vehicle user and highway user, the economic burden being placed rightly and justly on those specific high-density traffic regions where pollution is a problem and not on the millions of vehicle owners in rural areas where pollution control arrangements may be unnecessary and amount to only an economic waste.

Further objects, advantages, and features of the invention will become apparent to those skilled in the art from reading this disclosure including the specification and drawings in which:

FIG. 1 is an end view of a motor vehicle having an exhaust outlet arrangement shown in closely coupled position to a system for receiving and collecting and processing noise and exhaust emissions transmitted from the exhaust outlet which is embedded in the highway, the highway being shown in cross section;

FIG. 2 is a view in perspective of an exhaust outlet arrangement on the exhaust pipe extension of a motor vehicle showing details of the structure utilized to obtain various degrees of motion and optional close coupling to the inlet grating portion of the receiving means embedded in the highway;

FIG. 3 is a side view of an exhaust outlet arrangement on the end of a motor vehicle tailpipe shown in FIG. 2; and FIG. 4 is a circuit for automatically detecting and controlling the exhaust processing means of FIG. 1 when carbon monoxide levels along individual lengths of the highway exceed a predetermined level.

Turning now to FIG. 1, a main duct 11 capped at the highway surface by a grating 23 is seen positioned below the surface 21 in the same manner as is shown (with the same numerals) in FIG. 2 of U.S. Pat. application Ser. No. 545,117 previously referred to. Lane markers 16 and 22 delineate a lane of the highway upon which motor vehicle 1 is travelling. Inlet means 23 which comprises a grating is positioned at the center of the highway (midway between lane markers 16 and 22). Since the center of the grating 23 is located equal distances from the lane markers 16 and 22 there is little possibility that the wheels of either side of the vehicle will travel along a highway tracking on the grating. In changing lanes, however, the wheels of one side of the vehicle will cross over the grating 23 and at such times exhaust outlet 40 will not be located above the center grating 23. The width of grating 23 between lane markers 16 and 22 should be sufficiently large that most motor vehicles with side wheels straddling grating 23 and within lane markers 16 and 22 will have their exhaust outlets over the grating 23. The width of grating 23 therefore would be less than the distance between the inside dimension between side wheel 41 and other side wheel 42, viz less than 52 inches. The width of grating 23 should be greater than the diameter of prior art tailpipes viz greater than 2 inches. With less than perfect tracking due to imperfect driving exactly in the middle of the lane the inlet means must exceed 2 inches in width and must be less than the inside dimension (52 inches) between the two side wheels at front or rear of the vehicle if the vehicle is not to run along the grating 23.

The inlet grating 23 may be modified by providing the apertures thereof with means for permitting passage of exhaust only into the system without intake of outside air such as by tubes 27 with pressure valves 28 blown open by exhaust emissions as shown in FIG. 4 of the aforementioned application the details of which are incorporated herein by reference. Another means for maintaining a "closed" system would be by use of a membrane across and under grating 23 which would pass only certain exhaust emission components. Further means and mechanisms which will make inlet means 23 a "closed" system will become apparent to those skilled in the art, The present system as shown in FIG. 1 is an "open" system in the sense that exhaust emissions directed from exhaust outlet 40 freely flow through the inlet means comprising grating 23 into the main duct 11. However the present system is a "closed" system in the sense that suction fan 15 leads received exhaust emissions along the path represented by arrows 45 through unidirectional flow control means 48 comprising a vertically suspended trapdoor into processing or utilization means 44 only when a predetermined exhaust emission ingredient level is exceeded as indicated by carbon monoxide detector 50. A detailed explanation of how suction fan 15 is turned on by carbon monoxide detector 50 will follow in the discussion of the control system of FIG. 4. The present system as shown in FIG. 1 is "open" from inlet means 23 to the upper and lower sidewall portions of main duct 11 which are lined with acoustical materials 52 and 54 which have high sound absorbtive characteristics in the low-frequency audio range from 0 to 5,000 cycles per second so that exhaust noise is attenuated. The frequency passband of exhaust noise extends beyond the range just mentioned, however results of frequency analysis of exhaust noise studies already made indicate peak amplitude sound pressure levels at frequencies within the above defined range (See Handbook of Noise Control By Harris, published in 1957 by McGraw-Hill Publishing Co., beginning at page 31-16). The frequency of maximum noise amplitude can in fact be heard by an observer listening to the low-pitched hum or drone of many vehicles passing by on a crowded highway. It is this frequency of noise which is attenuated by acoustical materials 52 and 54 lining the upper and lower sidewall portions respectively of main duct 11. Materials such as fiberglass and as mentioned in the previously cited Handbook felt provide attenuation at exhaust frequencies within the audio range 0 to 5,000 cycles and may be utilized for example at 52 and 54 to line respectively the upper and lower sidewall portions of main duct 11. Other materials which absorb sound over the audio range 0 to 5,000 cycles may be selected for use at 52 and 54 by those audio engineers familiar with the acoustical characteristics of sound absorbing materials, the above being given merely by way of example. It can thus be seen that the system of FIG. 1 is "open" to receive exhaust noise and to provide attenuation thereof and is yet closed to provide increased efficiency in processing or purifying exhaust emissions. Lower opposite sidewall portions 54 slope downward and inward to form slot 63 at the bottom of main duct 11, Each length of duct 11 which runs parallel to and under a lane of the highway runs along the length of the highway at least a plurality of car lengths and terminated by a common end plate which may also form the termination for the next adjacent run of main duct as denoted by the numeral 12 in FIG. 3 of the aforesaid Pat. application Ser. No. 545,117. Side duct 13 shown in FIG. 1 of this application and also in FIG. 3 of the aforementioned patent application provides the passage from an individual run of the main duct 11 of exhaust emissions received through inlet means 23 to processing or utilization means 44. Suction fan 15 in conjunction with unidirectional flow control means 48 in side duct 13 cause the flow of emissions along the flow path denoted by arrows 45. Processing or utilization means 44 may comprise an electrostatic precipitator of known type which may be utilized to remove particulate matter from the exhaust stream 45. Other forms of processing of the exhaust emissions to remove at least one pollutant and thus purify the stream before returning the remainder to the atmosphere may comprise utilization means which utilizes one or more of emission products such as for example the carbon monoxide which may be utilized with steam at about 700°F. for 20 minutes on wet mixtures of garbage to provide useful petroleumlike byproducts as is known in the art. It can thus be seen that the byproducts of imperfect combustion present in the exhaust stream may be separated out sometimes as in the last mentioned case from the exhaust stream to be further utilized in other processes which provide byproducts of substantial economic value. Such may not always be the case as for example where processing means 44 comprises an electrostatic precipitator for removing particulate matter such as e.g. particulate lead. Suction fan 15' sucks the processed exhaust stream out of the side duct 13 into storm sewer means 70 so that the processed exhaust may escape to the atmosphere through drain entrance means 71 which may be a grating at the edge of the lane of the highway where runoff water normally enters and flows for remote removal by pipe 73. Any exhaust emission pollutants which may be made soluble in a liquid by some form of processing at 44 may also be run off by passage into sewer means 70 and away through pipe 73. Drainage of any rainwater which passes through grating 23 at the top of main duct 11 is by the way of slot 63 into pipe 75 which couples such water into pipe 73 of storm sewer means 70.

It can therefore be seen that the system of FIG. 1 provides noise attenuation in the material 52 and 54 which line and form the sidewalls of main duct 11 at least over the most objectionable range of noise frequencies of large amplitude found most disturbing to the human ear by motor vehicles of the passenger car type. Other types of motor vehicles having objectional noise outputs at other frequencies found disturbing would require sound attenuating materials at 52 and 54 having attenuation characteristics matching these other frequencies.

The motor vehicle 1 transmits the emissions and noise through outlet 40 to the receiving means of the system which includes inlet grating 23. The transmitting outlet 40 and the receiving means comprising inlet grating 23 are closely coupled to provide maximum transfer of exhaust from transmitting outlet 40 to receiving grating 23. A nearly flush relationship between exhaust outlet 40 and inlet grating 23 provides the closest coupling possible since less than a nearly flush relationship (with outlet 40 spaced further away from inlet grating 23) would cause loss and escape of emissions into the atmosphere rather than direction through the inlet grating 23 into main duct 11 while more than a nearly flush relationship (flush or in contact) would cause friction, vibration of, and possible damage and/or destruction of the portion of the exhaust outlet arrangement adjacent to and carrying the outlet 40. The range between undesirable loose coupling (outlet 40 too far away) and direct contact includes the above-mentioned nearly flush relationship where most of the exhaust is directed from outlet 40 through inlet grating 23. For motor vehicles such as passenger automobiles the outlet 40 should not be spaced further than 12 inches above the inlet grating 23 since the pressures at which the exhaust is propelled from the outlet 10 are not high enough to cause most of the exhaust to be directed to or coupled into the inlet grating 23 at distances exceeding 12 inches. In the case of diesel powered trucks the exhaust can be propelled a further distance and still mostly be caused to enter the inlet grating 23. A nearly flush relationship which provides effective coupling would exist where the spacing between outlet 10 and inlet means 23 is less than 12 inches but not flush or in direct contact. In the aforementioned Pat. application Ser. No. 545,117 the nearly flush relationship necessary to direct an appreciable amount of the exhaust into the system was provided by an extension of the known tailpipe over to and down between the rear wheels to that nearly flush position with the inlet grating. A further exhaust outlet arrangement 80 coupled to a known tailpipe 82 on a motor vehicle is shown in more detail in FIGS. 2 and 3 of this application which also provide a nearly flush relationship of exhaust outlet 40 with inlet grating 23. Such coupling can be selected at the option of the operator of the vehicle in the embodiment of FIGS. 2 and 3 shown in detail herein. The exhaust outlet 40 of the exhaust outlet arrangement 80 embodiment shown in more detail in FIGS. 2 and 3 of this application is arranged in a plane parallel to the plane of the inlet grating 23 as was the exhaust outlet 10 shown in FIG. 4 of the aforesaid application. Exhaust outlet 40 in the motor vehicle exhaust outlet arrangement 80 shown herein in FIG. 1 and in more detail in FIGS. 2 and 3 is arranged to provide close coupling by the nearly flush relationship with the inlet grating 23 as previously mentioned and is also arranged for positioning substantially midway between rear wheels 41 and 42 of motor vehicle 1, such location providing the requisite coupling with the previously defined position of inlet grating 23 midway between the lane edges defined by lane markers 16 and 22. Rear wheels 41 and 42 are thus in most instances not required to brake on inlet grating 23. The coefficient of friction over the inlet grating 23 would not be satisfactory particularly under wet conditions because of lessened surface area due to the presence of grating inlet louvres 91 and metallic surface areas 92 of the inlet grating surface when compared to the highway land surface 21 on either side of inlet grating 23 between lane markers 16 and 22 where in practicing the present invention the rear side wheels 41 and 42 would normally roll during braking and adequate traction would be provided.

Shown in FIG. 1 at the edge of the highway between drain entrance means 71 of storm sewer means 70 and curb 72 is display means 73 which is energized when a detected pollutant level is exceeded as detected by carbon monoxide detector means 50. Display means 73 becomes lighted by energization of the lamp inside when the concentration of vehicle or vehicles already past detector means 50 have dumped enough pollutants into main duct 11 raise the carbon monoxide level to the energizing threshold of carbon monoxide detector means 50. The system and circuit for energizing the lamps of display means 73 is shown in detail in FIG. 4 and hereafter described. Display means 73 is one form of utilization device responsive to the pollutant level detected by detector means 50 which is responsive to the degree or number of motor vehicles travelling along the lane of the highway past detector means 50. Recalling that each run of main duct 11 is provided with its detector means 50, side duct 13, suction fan 15 and processing means 44, it should be recognized that many such subsystems or sections adjacent one another make up for example a several mile run of the lane of the highway. A utilization means responsive to each detector means 50 of each run of main duct 11 of each subsystem may comprise instead of display means 73 a lamp on a control panel or an input signal to a computer for use in energizing traffic lights depending upon traffic volume indicated by the individual detector 50 distributed in the subsystems along the highway.

A side duct 13' is shown in FIG. 1 coupling and servicing a parallel section of main duct 11' in the next adjacent parallel lane of the highway in a manner which permits a single processing means 44 to service parallel sections of main duct 11 and 11'. Pipe 75 is seen in FIG. 1 to pass water 76 from slot 63 at the bottom of main duct 11 and from the corresponding slot at the bottom of parallel duct 11' servicing the adjacent parallel lane of the highway over to pipe 73 of storm sewer means 70 which also collects storm water through drain entrance means 71 comprising a grating or other sewer inlet opening construction if desired. It will be recognized by those skilled in the art that the system embodiment shown in FIG. 1 may be modified for use by motor vehicles of types other than passenger cars passing in a given direction along a highway e.g. locomotives where drain pipe 73 would not be required since drainage is through the material in the roadbed below the track and where duct 11 with inlet vent 23 would be located at the edge of the lane (outside the tracks). It should be noted that walls 77 extend along the edges of inlet means 23 upward from the highway surface 21. The height of each wall 77 in the case of motor vehicles such as passenger cars should not exceed approximately 1 inch and function as indicator means such as lane markers 16 and 22 to indicate as a warning to the passenger car 1 operator that he has caused his motor vehicle wheels to cross over inlet 23 and remove his vehicle from coupling exhaust emissions into the pollution prevention system. The walls 77 would therefore indicate to a sleepy driver that he has deviated from his lane and constitute an additional warning and safety device over known raised lane markers 16 and 22 of the prior art. In effect then the side wheels of vehicles are seen from FIG. 1 to track between walls 77 and lane markers 16 and 22 e.g. left rear wheel 41 of vehicle 1 between lane marker 16 and raised wall 77 and right wheel 42 between the other wall 77 and right hand lane marker 22. In the modified embodiment described where it is desired to practice the present invention with diesel locomotives at least in metropolitan area where restrictions to electric power instead of diesel power are now required because of polluting emissions it would be desirable to extend sidewalls 77 at the sides of inlet grating 23 upward a predetermined distance so that the exhaust outlets when brought down to the sides of the locomotives could simply direct the exhaust at least into the region between walls 77 and not necessarily on into outlet grating 23. In such manner it can be readily understood that air being sucked in through inlet grating 23 could also aid in drawing emissions above inlet grating 23 into the system for processing. In the locomotive embodiment, suction fan 15 would be required to have a higher c.f.m. rating since it would be exhausting main duct 11 as indicated previously in the passenger car case and also causing exhaust in the region between walls 77 above main duct 11.

While processing means 17, 18, and/or 19 shown in FIG. 2 of the aforementioned application are shown positioned at the level of the highway immediately thereabove, the present processing means 44 of this application shown in FIG. 1 is located at the level of the highway immediately therebelow so that it also is easily accessible from the highway surface for cleaning and/or servicing.

Turning now to FIG. 2 and 3 which show in detail the exhaust outlet arrangement 80 which is coupled to the end 84 of tailpipe 80 the exhaust stream depicted by arrows 90 is seen emanating from outlet 40 in a direction downward through the louvers 91 in grillwork 92 of inlet grating 23. Exhaust outlet 40 at the end of the tubular member 93 is maintained in the previously mentioned flush relationship with inlet grating 23 and facing downward and in a plane parallel therewith. The plane of exhaust outlet 40 is separated from the plane of the surface of inlet grating 23 by wheel 94 mounted on and between the ends of U-shaped bracket 95 which surround the end 96 of tubular member 93. Wheel 94 maintains a predetermined spacing between exhaust outlet 40 and the receiving inlet grating 23. Wheel 94 has a diameter of about 8 inches and supports exhaust outlet 40 about 3 inches above inlet grating 23. Louvers 91 in grillwork 92 are three-fourth inch by three-fourth inch square, however it will be understood by those skilled in the art that when the louvers comprise larger area openings, the wheel diameter of wheel 94 may be increased to provide smooth riding of arrangement 80 along inlet grating 23. Wheel 94 maintains exhaust outlet 40 in a nearly flush relationship with inlet grating 23 and prevents direct contacting of exhaust outlet 40 therewith and damaging of this and/or other parts of arrangement 80 which ride above inlet grating 23 on wheel 94. Tailpipe 82 which is downstream of the muffler as indicated in FIG. 4 is coupled at end 84 thereof to exhaust outlet arrangement 80. Arrangement 80 comprises swivel coupling means 97 which is connected to end 84 and provides rotation of arrangement 80 about vertical axis V–V' which is perpendicular to highway surface 21. This rotary coupling capability about vertical axis V–V' provides the left to right swivel of tubular members 93 as indicated by L–R arrows as the vehicle deviates from a straight path along the highway and thereby permits wheel 94 to roll and follow or property trailer behind the vehicle. Another degree of freedom of motion for exhaust outlet 40 is provided by spring means 101 which permits tubular member 93 to move up and down as depicted by arrows U–D and rotate around axis H–H' by means of rotary coupling means 98 which is similar in structure to the hereinbefore mentioned rotary coupling provided at 97. Spring means 101 comprises a band wound up between arm 102 fixed at 103 to rotary coupling means 98 and secured at the other end thereof to the upper end of tubular member 93 at 104. Secured also to the upper end (end opposite outlet 40) of tubular member 93 is arm 105 which is connected at the other end thereof by weld or other means known to those skilled in the art at 107 to Bowden wire 106. Bowden wire 106 as know to those skilled in the art comprises an inner wire or cable with outer sheath or housing and permits a run of the inner wire around corners etc. to a remote position where it may be pulled or pushed to effect motion at the other end thereof. Control of arm 105 by connection of the Bowden wire 106 at the end 107 thereof with the other end of Bowden wire 107 extending to the motor vehicle operator location as indicated in FIG. 3 provides the operator with the control function capability of raising or lowering tubular member 93 and outlet 40 to uncouple or couple outlet 40 to the inlet means 21 as required by traffic signs or pollution level indicators. When in open country or in areas not having highway surfaces 21 modified to incorporate inlet means 23 and the system of the present invention as would be the case in small towns unlike New York City and Los Angeles county which do not have a pollution problem, the operator would push Bowden wire 106 by a knob in the end thereof on his instrument panel or below the instrument panel in another convenient location and thereby raise tubular member 93 carrying outlet 40 so that the exhaust outlet arrangement 80 would be lifted up and wheel 94 removed from contact with the highway surface to prevent the possibility that exhaust outlet arrangement 80 or parts thereof should be damaged by objects protruding above the level of highway surface 21. When directed to couple exhaust emissions into the systems of the present invention by highway signs or signals the operator of the motor vehicle simply pulls the end of Bowden wire 106 from his operating position causing wheel 94 to touch and run along the surface of inlet grating 23 maintaining exhaust outlet 40 in nearly flush relationship with inlet grating 23 of the system as shown in dotted line position in FIG. 3, the tension of spring 101 acting to unwind and thereby urging wheel 94 downward against inlet grating 23 to provide damping and prevent bounce in exhaust outlet arrangement 80 and possible occasional decoupling or variation in the degree of coupling of exhaust 90 into the system of the present invention.

Referring now to FIG. 4 there is shown a partial block diagram and circuit schematic depicting one embodiment of a system for energizing elements of the system of the present invention according to pollutant levels detected at points along the path of travel of motor vehicles where the detector means are located and optionally controlling traffic flow or providing signals to other forms of utilization devices such as recording means or computer systems.

Shown in block 50 is a carbon monoxide detector also shown in FIG. 1 positioned in main duct 11. Carbon monoxide detectors which indicate a dangerous level of carbon monoxide in the air are well known and a known type may be utilized at 50 such as for example the carbon monoxide detector 10 shown in U.S. Pat. No. 3,445,669 to Jordon et al., which shows an output signal which energizes a relay coil in the collector circuit of the output stage of the detector. Relay 110 shown in FIG. 4 herein is energized by the output signal from detector means 50 and energizing coil 111 corresponds to the energizing coil of relay 52 of FIG. 5 of Jordan et al. When a dangerous condition of carbon monoxide is detected by detector 50, coil 111 is energized and relay 110 is closed thereby closing the contacts of single pole single throw (S.P.S.T.) switches S1, S2, S3, and S4. Under dangerously high-level carbon monoxide conditions and really 110 energized with switches S1, S2, S3, and S4 closed, the potential from alternating current AC source 112 is placed across the power for processing means 44 which may be electrostatic precipator thus turning it on and suction fans 15 and 15'. While source 112 may be 115 volts AC where suction fans 15 and 15' are of the 115-volt AC type, a higher source voltage 112 may be utilized with correspondingly higher voltage fan types 15 and 15'. Display means 73 which comprises a lamp is also of the 115-volt type where source 112 is 115 volts AC and is also energized since switch S1 is closed placing lamp 73 across source 112. While utilization means 73 here is shown as a lamp to indicate to vehicles that the system is processing exhaust emissions under dangerously high pollution conditions (in the present example a high carbon monoxide level exists), utilization means 73 may be an input device in a computer or traffic control system or monitoring system at a remote location.

Switch 55 is connected in series with source 112 and is the main switch which must be closed before detecting means 50 can control since switch 55 controls the power applied by source 112 to the parallel connected elements 73, 15, 15', and 44.

Processing means 44 as heretofore mentioned may e.g. comprise an electrostatic precipitator for removing particulate material from the received exhaust stream 45 or may comprise utilization means previously mentioned for recovering and/or processing the exhaust stream to accumulate products or by products of value. As a further example of utilization means 44 which could convert exhaust emissions to products of economic value, such utilization means 44 could comprise a carbon monoxide to hydrogen converter of the type shown in U.S. Pat. No. 3,490,872 to Fenton where a high yield of hydrogen is obtained from carbon monoxide and mild temperature and pressure conditions. While the disclosed motor vehicle embodiments show exhaust outlets arranged for direct coupling of exhaust to highway structures for further processing or utilization, processing upstream of the outlet in the vehicle itself is not to be excluded from the present system concept since in such cases the present processing means 44 would either complement and/or supplement such processing means on the vehicle thereby improving the pollution prevention of the same type and/or other types of pollutants respectively.

The foregoing discussion and description has been made in connection with preferred specific embodiments of the new exhaust outlet apparatus systems for coupling to motor vehicle exhaust outlets and system controlled thereby, and it is to be understood that the discussion and description is only intended to illustrate and teach those skilled in the art how to practice the invention, and such is not to unduly limit the scope of the invention, which is defined in the claims set forth hereinafter.

I claim:

1. A motor vehicle having an exhaust pipe, the improvement comprising means coupled to said exhaust pipe and extending therefrom a predetermined distance to provide an exhaust outlet nearly flush with the highway surface under said vehicle, said means coupled to said exhaust pipe comprising means for preventing decoupling of said exhaust outlet from said nearly flush relationship with the highway surface, said means for preventing decoupling comprising a wheel mounted adjacent said exhaust outlet for supporting said exhaust outlet said predetermined distance above the highway surface to provide said nearly flush relationship.

2. A motor vehicle according to claim 1 further comprising spring means arranged for urging said wheel downward against said highway surface to prevent bounce of said exhaust outlet.

3. A motor vehicle according to claim 1 further comprising means for lifting up said outlet and removing said wheel from contact with said highway surface.

4. A motor vehicle according to claim 1 wherein said wheel is arranged to support said exhaust outlet about 3 inches above said highway surface.

5. A motor vehicle according to claim 1 wherein said means coupled to said exhaust pipe comprises a tubular member, said wheel mounted on a bracket which surrounds said tubular member.